United States Patent Office 3,031,389
Patented Apr. 24, 1962

3,031,389
METHOD OF MAKING FUEL BODIES
Walter V. Goeddel, San Diego, and Massoud T. Simnad, La Jolla, Calif., assignors, by mesne assignments, to the United States of America as represented by the United States Atomic Energy Commission
No Drawing. Filed Dec. 31, 1958, Ser. No. 784,064
3 Claims. (Cl. 204—154.2)

The present invention is directed generally to an improved method of making fuel bodies for use in nuclear reactors. The invention is more specifically directed to the production of high density, mechanically strong fuel bodies which include a matrix of carbon or graphite which carries the carbide of a fissile material or the carbides of combinations of fissile and fertile materials.

In a reactor the fuel elements of which are to be maintained at relatively high operating temperatures it is important that the fuel body be mechanically strong, have uniform energy producing and heat transmitting characteristics throughout the body, and be of desired density. The foregoing properties are important for the fuel body to provide optimum conduction of heat without the development of isolated areas of elevated temperatures. Also, a fuel body of the proper density acts to inhibit the migration of unwanted fission products through and from the fuel body.

Heretofore, fuel bodies for use in reactors have been made by mixing the nuclear fuel with carbon or graphite together with pitch and binders, after which the material is cold pressed into the desired form. After the cold pressing, the formed body is baked at an elevated temperature in order to vaporize the volatile materials. In order to achieve optimum density and lack of porosity in the final product, the baking must be carried on at slow rate and over an extended period of time and often the baking period extends over a number of days or even over several weeks. Attempts have been made to speed up the baking procedure in the prior art. However, when this is done, the rate of evolution of gas and volatiles is so great that the resulting fuel body becomes quite porous. Also, with the known methods of fabrication, the green density and green strength (before baking) are greater than after baking or firing. In other words, the baking reduces the density and strength and results in a weaker, more porous product.

These problems are particularly accentuated when the fuel element is to be operated at high temperatures since more stresses and strains are produced in the fuel body due to expansion and also at these temperatures, migration of unwanted fission products becomes more of a problem. Accordingly, it is extremely important when fabricating a fuel body or compact to be used in a high temperature reactor, that a strong, relatively non-porous body be obtained.

Accordingly, it is the principal object of this invention to provide a fuel body which is non-porous and mechanically strong. It is also an object of the invention to provide a method of making fuel bodies of the class described which can be carried out at lower temperatures than those which have been heretofore employed, but which at the same time will provide a resulting fuel body which is stronger and more impervious to diffusible products than those made by the known methods. It is a further object of the invention to provide a method of making fuel bodies which may be carried out in a short period of time thereby obviating the long baking procedure which has heretofore been used. It is a specific object of the invention to provide an improved, mechanically strong, substantially non-porous fuel body of uranium carbide or a mixture of uranium carbide and thorium carbide.

Other objects and advantages of the invention will become known from the following description of the invention.

Basically, the method of the invention involves first mixing the nuclear fuel material with the desired amount of carbon or graphite together with a suitable binder or bonding material and the other materials which may be included in the fuel body. The mixture is then placed in a die of the proper shape and size to produce a fuel body of the desired dimensions and in which the mixture may be heated to temperatures which will effect a bonding of the particles together. Pressure is then applied to the mixture and it is heated while maintaining it under pressures preferably over about 2,000 pounds per square inch. The pressure is maintained on the mixture until bonding is completed.

It has been determined that the bonding is completed when employing the hot pressing method of the invention, in a period of less than about one hour, often in a period of 5 to 15 minutes, as compared with periods as long as several weeks required for baking when the prior art methods are employed. Moreover, the temperatures required for bonding may be reduced substantially as compared with those required to effect bonding when the cold pressing and baking method is employed. The fuel body made by this method is also more dimensionally accurate, is mechanically strong, and is otherwise more satisfactory than fuel bodies made by the prior art methods.

It has also been found that, if the mixture of fuel and carbon to be compacted is heated to the desired temperature in such a way that the entire body is heated substantially uniformly to the same temperature for substantially identical periods of time, the dimensional stability and mechanical strength of the ultimate body are increased as is its imperviousness. It has been found that uniform heating may be accomplished by pressing the fuel mixture in a suitable die and passing high level electrical currents through the body for the desired period while it is being pressed. The current density and other current characteristics are chosen to produce and maintain the proper temperature for bonding over the heating and pressing period.

Also, it has been found that by correlating the size ranges of the carbon and carbides of the nuclear fuel, the proportion of pitch and the temperatures and pressures employed in the pressing operation, a more impervious, mechanically stronger body may be produced.

As pointed out above, the method of this invention has particular applicability to the fabrication of fuel bodies from uranium and thorium carbides. Accordingly, the following specific examples will be directed to the production of a uranium and thorium carbide fuel bodies; however, it will be apparent that the method of the invention may be employed with equal advantage in the fabrication of fuel bodies from other fissile and fertile materials.

Example 1

Uranium and thorium carbides in the desired proportions for a fuel element are mixed together with a suitable amount of pitch and graphite or carbon and are placed in a mold having the dimensions of the fuel element to be produced. Desirably, the carbides are prepared in the proper size range, which has been found to be between 100 and 500 microns for preferred results. The carbon is sized so that it will pass through a 200 mesh screen but will be held on a 325 mesh screen. The pitch comprises about 10 percent by weight of the mixture.

Pressure of about 3,000 pounds per square inch is applied to the mixture in the die through a pressure plate, and the die and mixture are heated in a reducing atmosphere to a temperature of about 750° C. At about 300° C. the pitch starts to decompose but binding is not effected until a higher temperature is reached. The heating is continued for about 15 minutes at which time substantially all of the gas and volatiles are evolved from the fuel body. At that time the fuel body is slowly cooled and it will be found that the body is compact, has low porosity, and is mechanically strong.

Prior to use, the body can be reheated in a vacuum to remove any absorbed gases. The heating prior to use should be to a temperature well above the temperature to which the fuel body will be subjected during use in the reactor.

*Example 2*

The procedure of Example 1 is followed but the heating is accomplished by passing an electrical current through the material in the die. This is accomplished by connecting the pressure plate in the die to one terminal of a source of electrical current and connecting a conductor in the base of the die to the other terminal. An electrical current of a magnitude sufficient to produce the temperature of 750° C. is applied, which temperature is maintained until substantially all gas and volatiles are evolved. The resulting fuel body is strong and relatively nonporous.

As has been pointed out above, the size range of the carbon employed in the fuel element is of importance in obtaining the desired properties of strength and relative non-porosity. Preferably, the carbon should be sized to pass through a 100 mesh screen and desirably it should be of such a size that it passes through a 200 mesh screen but is held on a 325 mesh screen.

The amount of pitch employed may vary over wide limits. For example, from as low as 3 percent by weight to as much as 25 percent by weight may be employed. However, about 10 percent pitch is preferred to produce the preferred balance between strength and non-porosity.

As has been pointed out, the pressure should be over about 2,000 pounds per square inch, the upper limit being determined for all practical purposes by the physical strength of the equipment available. As to temperature, this, too, can vary over a wide range. As has been pointed out, the pitch begins to decompose at about 300° C. but it is necessary to heat to at least about 500° C. to accomplish the desired result. Heating can be effected to any desired degree in an inert atmosphere but the strength characteristics tend to decrease somewhat over 1700° C. thus the temperature is desirably maintained in the range between 500 and 1700° C. with the preferred range being between about 700 and 900° C.

The time of heating is, of course, that required to effect a volatilization of the volatile materials in the green fuel material. When the method of the invention is employed the heating usually requires one hour or less and under most conditions the heating period need only require from 5 to 15 minutes.

Generally, it may be stated that similar results may be obtained at somewhat lower temperatures by raising the pressure under which the material is pressed so that by adjusting the amount of pressure it is possible to lower the temperature somewhat. Of course, as has been pointed out above, it is necessary in order to decompose the pitch to reach a temperature of at least 500° C. or above.

Also, in practicing the method of the invention, it is sometimes desirable to employ a preliminary cold pressing operation to aid in handling the green fuel body material. When this is done a small amount of readily volatizable binder such as tar or the like may be added to provide a low strength bond which will maintain the shape of the compact after a cold pressing operation. The cold pressed body may then be hot pressed in accordance with the invention to provide the ultimate bonding and densification.

Fuel bodies made in accordance with this invention have been found to be extremely dense and impervious, some having a density in excess of 1.8 grams per cubic centimeter. These bodies had mechanical strength 50 percent greater than commercial reactor grade graphite. By the use of the invention, dense, strong fuel bodies having especially good dimensional accuracy may be produced in short periods of time thereby avoiding the laborious and time consuming operations which were required by the prior art methods.

Various features of the invention are set forth in the appended claims.

We claim:

1. The method of making a fuel body for use in a nuclear reactor which comprises making a mixture for a fuel compact which includes a mixture of the carbides of uranium and thorium having a particle size of from 100 to 500 microns, carbon having a particle size such that it will pass a 100 mesh screen, and from about 3 to 25 percent by weight of pitch, heating said mixture to a temperature of from about 500 to 1700° C. at which bonding will be effected while maintaining it under mechanical pressure of over 2,000 pounds per square inch, the entire body of said mixture being heated to a substantially uniform temperature.

2. The method of making a fuel body for use in a nuclear reactor which comprises making a mixture for a fuel compact which includes a mixture of the carbides of uranium and thorium having a particle size of from 100 to 500 microns, carbon having a particle size such that it will pass a 200 mesh screen but be retained by a 325 mesh screen, and from about 3 to 25 percent by weight of pitch, heating said mixture to a temperature of from about 700 to 900° C., at which bonding will be effected while maintaining it under mechanical pressure of over 3,000 pounds per square inch, the entire body of said mixture being heated to a substantially uniform temperature.

3. The method of making a fuel body for use in a nuclear reactor which comprises making a mixture for a fuel compact which includes a mixture of the carbides of uranium and thorium having a particle size of from 100 to 500 microns, carbon having a particle size such that it will pass a 200 mesh screen but be retained by a 325 mesh screen, and 10 percent by weight of pitch, heating said mixture to a temperature of from about 700 to 900° C., at which bonding will be effected while maintaining it under mechanical pressure of over 3,000 pounds per square inch, the entire body of said mixture being heated to a substantially uniform temperature, by passing an electric current through said mixture to heat it to the bonding temperature and maintaining said mixture at said elevated temperature under pressure until volatiles and gas are no longer evolved in substantial quantities.

References Cited in the file of this patent

UNITED STATES PATENTS

| | | |
|---|---|---|
| 2,089,030 | Kratky | Aug. 3, 1937 |
| 2,725,288 | Dodds et al. | Nov. 29, 1955 |
| 2,910,416 | Daniels | Oct. 27, 1959 |

OTHER REFERENCES

AECD–4095, April 1950, in particular pages 6 and 12.

ANL–5797, Report of Period Ending September 1957, pages 5 and 6.

ANL–5790, Report of Period Ending June 1957, pages 29–30.

TID–10001, October 13, 1954.

TID–7546, Book 1, Fuel Element Conf., November 1951, pages 236–237.

ANL–5797 of record including pages 22–23.

AEC Document NYO–7553, April 1, 1956, in particular pages 2–4.